(12) United States Patent
Finegan et al.

(10) Patent No.: US 8,318,848 B2
(45) Date of Patent: *Nov. 27, 2012

(54) SCRUB AND STAIN-RESISTANT COATING

(75) Inventors: Catherine Ann Finegan, Warrington, PA (US); Ozzie M. Pressley, Cheltenham, PA (US); William D. Rohrbach, Perkasie, PA (US); Wei Zhang, Maple Glenn, PA (US)

(73) Assignee: Rohm and Haas Company, Philadelphia, PA (US)

( * ) Notice: Subject to any disclaimer, the term of this patent is extended or adjusted under 35 U.S.C. 154(b) by 552 days.

This patent is subject to a terminal disclaimer.

(21) Appl. No.: 11/711,351

(22) Filed: Feb. 27, 2007

(65) Prior Publication Data

US 2007/0208129 A1 Sep. 6, 2007

Related U.S. Application Data

(60) Provisional application No. 60/778,327, filed on Mar. 2, 2006.

(51) Int. Cl.
*C08K 3/22* (2006.01)
(52) U.S. Cl. .......................... 524/497; 524/547
(58) Field of Classification Search .................... 524/497
See application file for complete search history.

(56) References Cited

U.S. PATENT DOCUMENTS

| | | | |
|---|---|---|---|
| 4,110,285 A | 8/1978 | Pons et al. | |
| 4,506,057 A | 3/1985 | Greene et al. | |
| 5,191,029 A | 3/1993 | DelDonno | |
| 5,268,197 A | 12/1993 | Pons et al. | |
| 5,385,960 A * | 1/1995 | Emmons et al. | 523/205 |
| 6,080,802 A | 6/2000 | Emmons et al. | |
| 6,485,786 B2 | 11/2002 | Deng et al. | |
| 2001/0031826 A1* | 10/2001 | Laubender et al. | 524/558 |
| 2002/0090459 A1* | 7/2002 | Even | 427/385.5 |
| 2005/0090619 A1* | 4/2005 | Yoshimura et al. | 525/243 |
| 2005/0107527 A1 | 5/2005 | Holub et al. | |
| 2007/0021536 A1* | 1/2007 | Pressley et al. | 524/115 |

FOREIGN PATENT DOCUMENTS

| | | |
|---|---|---|
| EP | 1277766 | 1/2003 |
| GB | 2 038 846 A * | 7/1980 |
| GB | 2038846 | 7/1980 |
| WO | WO93/11181 | 6/1993 |
| WO | WO93/12183 | 6/1993 |
| WO | WO99/25780 | 5/1999 |
| WO | WO 03/057738 * | 7/2003 |
| WO | WO 2005/097853 | 10/2005 |

OTHER PUBLICATIONS

Chen, Ming J., "Phosphate Monomers as Adhesion Promoters and Latex Stabilizers", Rhodia Inc., Cranbury, N.J., ICE 2000, pp. 313-326.

* cited by examiner

*Primary Examiner* — Doris Lee
(74) *Attorney, Agent, or Firm* — Reid S. Willis (57) ABSTRACT

A coating composition comprising aqueous dispersion of particles made from a copolymer comprising, based on the weight of the copolymer one or more monoethylenically unsaturated monomers; acid functional or anionic monomer and phosphorous-containing monomer.

7 Claims, 1 Drawing Sheet

SCRUB AND STAIN-RESISTANT COATING

This application claims the benefit of U.S. Provisional Application 60/778,327 filed Mar. 2, 2006.

This invention is an improved waterborne coating composition with a combination of high scrub resistance, high stain resistance, and ease of manufacture. More particularly, this invention relates to a vinyl polymer with an optimized level of phosphorus-containing functional groups, in conjunction with an optimized level of acid-functional or anionic monomers, steric pendant groups and titanium dioxide.

Desirable interior wall coatings should be resistant to common household stains. Stain resistance involves two things: the coating's ability to resist the stain when the coating is exposed to the staining material, and the coating's ability to withstand scrubbing to remove the residual staining material that the coating did not fully resist.

Polymeric binders used in interior wall coatings are materials that should be adapted to mass manufacturing, where the ease and repeatability of formulation of these materials is an additional important performance feature to the paint manufacturer.

Another important performance feature to the large scale paint manufacturer is the utilization efficiency of titanium dioxide pigment in the coating, where "efficiency" refers to how well the titanium dioxide particles are spaced in the applied coating. The titanium dioxide provides hiding to a coating, although titanium dioxide has a tendency to agglomerate. Well spaced titanium dioxide means less of that material agglomerates, and thus less material is needed to achieve the same degree of hiding as compared to titanium dioxide that is less well spaced. Polymeric binders that adsorb to titanium dioxide can space the titanium dioxide to a good degree, resulting in improved utilization efficiency of titanium dioxide. For example, polymeric latex binders containing phosphorus-containing functional groups are especially well-suited to latex adsorption as described, for example, in U.S. Pat. No. 6,080,802. Although well-suited for latex adsorption, latexes with pendant phosphorus functionality have not been generally suitable for use in interior wall coatings because a good balance of key properties such as scrub resistance, stain resistance, and ease of manufacture have not been achieved.

U.S. Pat. No. 5,385,960 discloses a process for controlling adsorption of polymeric latex on titanium dioxide. In this process, a procedure is used where an amount of dibasic phosphate is added at the end of paint manufacture in order to stabilize the viscosity of the paint. In U.S. Pat. No. 5,385,960, polymer compositions are disclosed that contain one percent by weight of phosphoethyl methacrylate and 1.3 percent by weight of methacrylic acid and 3.0% by weight of a nonionic surfactant. In the example (Example B) which discloses this type of composition, improved hiding and gloss are reported. However, it is well known that the high levels of acid used in this kind of coating creates an interior wall coating with high water sensitivity. This leads, in part, to poor scrub resistance with an aqueous scrub medium. U.S. Pat. No. 6,080,802 reports a similar high acid coating.

U.S. Pat. No. 6,485,786 discloses an aqueous stain-blocking composition using a copolymer containing 1.5-6% by weight of a strong acid phosphorus-containing monomer. Additionally the emulsion copolymer may contain from 0 to 5% by weight, preferably 0-1% of a copolymerized ethylenically unsaturated carboxylic acid monomer. As indicated above, the use of high levels of acid-functional monomer imparts sensitivity to water, but without very high levels of acid such high levels of phosphorus-containing monomer is problematic to paint manufacture, especially with respect to grit formation and viscosity stability.

This invention involves a coating composition that contains a copolymer with specific levels of functional monomers in conjunction with a steric barrier. When used in combination at the appropriate levels, a very desirable balance of properties required for an interior wall coating is obtained.

One aspect of the invention is a coating composition comprising:

(A) an aqueous dispersion of particles made from a copolymer comprising, based on the weight of the copolymer:
  (i) 97.5-99.3 parts by weight of one or more monoethylenically unsaturated monomers;
  (ii) 0.1-1.0 parts by weight of an acid-functional or anionic monomer; and
  (iii) 0.6-1.5 parts by weight of phosphorus-containing monomer; and where the dispersion further comprises 0.5-5.0 parts by weight, in relation to parts of the copolymer, of an entity containing $-(CH_2-CHRO)_z-X$ groups, where R=H or $CH_3$, z=3-60, and X is a nonionic, anionic or amphoteric functionality, wherein the $-(CH_2-CHRO)_n-X$ groups are pendant from the surface of the particles; and
(B) titanium dioxide.

One embodiment of this invention is the composition described above wherein the copolymer is produced in a process, where the pH is maintained at 1.5 to 4.5 (or more preferably at 1.5 to 3.5) throughout at least 70% of the phosphorus-containing monomer feed.

Another embodiment is the composition above wherein monomers (ii) and (iii) are co-fed to the polymerization.

Another embodiment is the composition above wherein the copolymer comprises 0.75-1.0 parts by weight of phosphorus-containing monomer.

Another embodiment is the composition above wherein the copolymer comprises 0.2-0.5 parts by weight of acid-functional or anionic monomer.

Another embodiment of the invention is the composition above wherein the $-(CH_2-CHRO)_z-X$ groups are introduced as copolymerizable surfactants having at least one polymerizable ethylenically unsaturated bond or polyalkylene oxide-derivatized (meth)acrylate monomers.

This invention comprises a vinyl polymer with an optimized level of phosphorus-containing functional groups, in conjunction with an optimized level of acid-functional or anionic monomers, in conjunction with an optimized level of pendant steric groups, together with titanium dioxide, as a pigment or filler, in a coating composition. It has been surprisingly found that low levels of acid-functional or anionic monomers in conjunction with pendant ethoxylate or propoxylate groups, effectively slows down latex adsorption of the phosphorus-functional latex onto titanium dioxide particles, while providing the paint with practical viscosity stability. The controlled speed of latex adsorption allows the mass production of paint substantially free of grit, while providing paint with both practical viscosity stability and efficient titanium dioxide usage. In other polymers, grit is formed by high localized concentrations of pigment in an environment in which there is insufficient latex particles for complete latex adsorption onto the titanium dioxide particles, and where rapid adsorption can cause bridging flocculation. In the copolymer used in this invention, we surprisingly found that the key balance of properties: high resistance to scrubbing, high resistance to household stains, and ease of paint manufacture can be achieved while using the inventive phosphorus-functional latex. This beneficial balance of properties, we believe, is achieved by the use of specific levels of co-fed functional monomers in conjunction with pendant ethoxylate or propoxylate groups that provide an optimized level of steric hindrance to the latex particle.

Although we do not want to be limited to a particular theory, we believe that the acid-functional or anionic monomers disrupt the formation of blocks of phosphorus-containing monomers in the polymer. In prior polymers with phosphorus-containing monomers, formation of blocks of phosphorus-containing monomers in the polymer, and the resulting multidentate chelating ability, is believed to contribute strongly to the speed of latex adsorption onto the titanium dioxide, leading to grit formation. If formation of these blocks is mitigated through the use of a co-feed of acid-functional or anionic monomer, the ultimate level of latex adsorption is not altered, as this is largely controlled by the phosphorus content. The speed of latex adsorption is slowed by the substantial lack of phosphorus blocks, allowing the production of substantially grit free paint in a modern mass manufacturing environment employing large equipment of low power per unit volume. Although not wishing to be limited by a particular theory, the speed of latex adsorption can be controlled even more beneficially through the additional use of a steric barrier on the surface of the latex, such as obtained through the post-addition of an ethoxylate or propoxylate surfactant, or through the use of copolymerizable surfactants having at least one polymerizable ethylenically unsaturated bond, or similar materials.

Thus, we surprisingly found that a beneficial balance of properties—scrub resistance, stain resistance, titanium dioxide efficiency via latex adsorption, very low grit, and viscosity stability—can be achieved in one coating composition.

The composition of this invention is a coating composition comprising an emulsion copolymer whose polymerized units comprise 97.5-99.3 parts by weight of monoethylenically unsaturated monomers, based upon the weight of the polymer. The terms (meth)acrylic and (meth)acrylate herein refer to acrylic or methacrylic, and acrylate or methacrylate, respectively. Thus, suitable ethylenically unsaturated monomers include, for example, (meth)acrylic esters including $C_1$ to $C_{40}$ esters of (meth)acrylic acid such as methyl(meth)acrylate, ethyl(meth)acrylate, butyl(meth)acrylate, 2-ethylhexyl (meth)acrylate, decyl(meth)acrylate, lauryl(meth)acrylate, stearyl(meth)acrylate, isobornyl(meth)acrylate; hydroxyalkyl esters of (meth)acrylic acid such as hydroxyethyl(meth) acrylate and hydroxypropyl(meth)acrylate; (meth)acrylamide, propenamide, and dimethylacrylamide; (meth) acrylonitrile; amino-functional and ureido-functional monomers; monomers bearing acetoacetate-functional groups; α-olefins such as 1-decene; styrene or substituted styrenes; vinyl acetate, vinyl butyrate and other vinyl esters; vinyl monomers such as vinyl chloride, vinyl toluene, and vinyl benzophenone; vinylidene chloride; N-vinyl pyrrolidone; ethylene, propylene, and butadiene. Preferred are all-acrylic, predominantly acrylic, styrene/acrylic, and vinyl acetate/acrylic copolymers.

The emulsion copolymer of the inventive coating compositions comprises polymerized units which also comprise from 0.1-1.0 parts by weight, based on the weight of the polymer particles, and more preferably 0.2-0.5% by weight, of acid-functional or anionic monomer. "Acid-functional or anionic monomer" refers to ethylenically unsaturated monomers containing acid groups or their salts, except for phosphorus-containing acid groups (or their salts). Suitable acid groups include monomers containing carboxylic acid groups and sulfur acid groups or their respective anions. Examples of unsaturated carboxylic acid monomers (or their respective anions) include acrylic acid, methacrylic acid, crotonic acid, itaconic acid, fumaric acid, maleic acid, and mono-ester derivatives of diacids, such as monomethyl itaconate, monomethyl fumarate, and monobutyl fumarate. Also included is maleic anhydride, that is able to function similarly. Examples of monomers containing sulfur acid groups include 2-acrylamido-2-methyl-1-propanesulfonic acid, sulfoethyl (meth)acrylate, and vinyl sulfonic acid.

The emulsion copolymer of the inventive coating compositions comprises polymerized units which also comprise from 0.6-1.5 parts (preferably 0.75-1.0 parts) by weight, based on the weight of the polymer, of phosphorus-containing monomer. Examples of suitable phosphorus-containing monomers include dihydrogen phosphate esters of an alcohol in which the alcohol also contains a polymerizable vinyl or olefinic group, such as allyl phosphate; mono- or diphosphate of bis(hydroxymethyl)fumarate or itaconate; derivatives of (meth)acrylic acid esters, such as, for example, phosphates of hydroxyalkyl-(meth)acrylate including 2-hydroxyethyl-(meth)acrylate, 3-hydroxypropyl-(meth)acrylates, and the like. Thus, dihydrogen phosphate ester monomers include phosphoalkyl(meth)acrylates, such as 2-phosphoethyl(meth) acrylate, 2-phosphopropyl(meth)acrylate, 3-phosphopropyl (meth)acrylate, phosphobutyl(meth)acrylate and 3-phospho-2-hydroxypropyl(meth)acrylate. For purposes of this invention, phosphoalkyl(meth)acrylates include ethylene oxide condensates of (meth)acrylates such as $H_2C=C(CH_3)COO(CH_2CH_2O)_nP(O)(OH)_2$, where n is from 1 to 50. Phosphoalkyl crotonates, phosphoalkyl maleates, phosphoalkyl fumarates, phosphodialkyl(meth)acrylates, phosphodialkyl crotonates, and allyl phosphate can all be used. Other suitable phosphorus-containing monomers are phosphonate-functional monomers, such as those disclosed in WO 99/25780 A1, and include vinyl phosphonic acid, allyl phosphonic acid, 2-acrylamido-2-methylpropanephosphinic acid, α-phosphonostyrene, and 2-methylacrylamido-2-methylpropanephosphinic acid. Still other suitable phosphorus-containing monomers are 1,2-ethylenically unsaturated (hydroxy) phosphinylalkyl(meth)acrylate monomers, such as disclosed in U.S. Pat. No. 4,733,005, and include (hydroxy)phosphinylmethyl methacrylate.

Preferred phosphorus-containing monomers are phosphates of hydroxyalkyl methacrylates, with 2-phosphoethyl (meth)acrylate (PEM) being the most preferred.

The coating compositions of this invention comprise emulsion copolymer particles and also comprise an entity containing —$(CH_2$—$CHRO)_z$—X groups, where R=H or $CH_3$, z=3-60, and X is a nonionic, anionic or amphoteric functionality, wherein that functionality is pendant from the surface(s) of the particles. More preferably z is in the range 5-15, and both R and X=H. By "pendant," we mean either or both of two things: (1) that the —$(CH_2$—$CHRO)_z$—X group may be appended to a vinyl-containing group that can be polymerized into the copolymer by adding that material during the polymerization step; and (2) a substance that contains a —$(CH_2$—$CHRO)_z$—X group that is added to the dispersion of copolymer particles but does not polymerize into the copolymer but rather the group is part of a moiety that is adsorbed to the latex particle surface, for example, via ionic attractions or via Van der Waals attractions.

In the first case, the —$(CH_2$—$CHRO)_z$—X group may be attached to a polymerizable group and copolymerized onto the particle, thus attaching the group covalently to the latex particle during the emulsion synthesis, such as through the use of a material covalently bonded to the —$(CH_2$—$CHRO)_z$—X group having at least one polymerizable ethylenically unsaturated bond (for example, the Hitenol™ monomers from Daiichi Corp. described in U.S. patent application Ser.

No. 11/255,635), or similar materials. This may include other monomers that can be copolymerized with the polymer, such as the polyalkylene oxide-derivatized (meth)acrylate type monomers described in U.S. Patent Publication 2001/0031826 (paragraphs 0001-0002) or the polymerizable surfactants described in U.S. patent application Ser. No. 11/255,635. If this first approach is taken, the copolymer then further comprises the additional co-monomer in an amount from 0.5-5.0 (and more preferably 0.5-3.0) parts by weight, based on the weight of the rest of the copolymer, of the entity containing —(CH$_2$—CHRO)$_z$—X groups. In this first case, the sum of the parts by weight of monomers and polymerizable surfactants that comprise the copolymer can be more than 100 parts in total.

In the second case (i.e. adsorption of the —(CH$_2$—CHRO)$_z$—X moiety), examples of adsorption agents suitable for the introduction of the —(CH$_2$—CHRO)$_z$—X group include nonionic surfactants such as ethoxylated nonylphenols, propoxylated nonylphenols, ethoxylated alcohols, or propoxylated alcohols, etc. When the —(CH$_2$—CHRO)$_z$—X group is introduced via adsorption, such introduction can be made during or following polymerization (even at any step of the coating composition formulation). If this approach is taken, the polymer dispersion further comprises from 0.5-5.0 (and more preferably 0.5-3.0) parts by weight in relation to parts of the copolymer, of the entity containing —(CH$_2$—CHRO)$_z$—X groups.

The composition of this invention is a coating composition that also comprises titanium dioxide as one of the pigment components. The surface of the titanium dioxide particles used can be adjusted in a number of different ways. The particles can be pretreated with silica, zirconia, aluminum oxide, or mixtures thereof. The titanium dioxide particles may be added to the coating composition as a dry powder or as a slurry in water with other dispersing constituents present in the slurry.

The composition of this invention comprises titanium dioxide pigment particles. The composition optionally also comprises filler particles. Preferably, the total amount of titanium dioxide and fillers, combined, as a percentage of total acrylic polymer solids is from 1% to 400%, more preferably from 50% to 200%. Examples of fillers and pigments include, e.g., titanium dioxide, zinc oxide, clay, iron oxide, magnesium silicate, calcium carbonate and combinations thereof. Preferably, the composition of this invention comprises titanium dioxide. Preferably, titanium dioxide particles are orthogonal, i.e., no cross-sectional dimension through a particle is substantially greater than any other cross-sectional dimension through the same particle. Examples of orthogonal particles are spherical and cubic particles, and those having shapes intermediate between spherical and cubic. Preferably, the amount of titanium dioxide as a percentage of total acrylic polymer solids is from 1% to 200%, more preferably from 50% to 150%.

A photoinitiator may optionally be used in the composition of this invention to enhance dirt resistance, for example, a substituted acetophenone or benzophenone derivative as is taught in U.S. Pat. No. 5,162,415.

The polymeric binder used in this invention is a substantially thermoplastic, or substantially uncrosslinked, polymer when it is applied to the substrate, although low levels of adventitious crosslinking may also be present.

The "glass transition temperature" or "$T_g$" of the copolymer is preferably from −20 to 60° C., more preferably −10 to 40° C., most preferably 0 to 30° C. It is measured by differential scanning calorimetry (DSC). "$T_g$" is the temperature at or above which a glassy polymer will undergo segmental motion of the polymer chain. To measure the glass transition temperature of a polymer by DSC, the polymer sample is dried, preheated to 120° C., rapidly cooled to −100° C., and then heated to 150° C., at a rate of 20° C./minute while DSC data are collected. The glass transition temperature for the sample is measured at the midpoint of the inflection using the half-height method.

The practice of emulsion polymerization is discussed in detail in D. C. Blackley, *Emulsion Polymerization* (Wiley, 1975). Conventional emulsion polymerization techniques may be used to prepare the polymer composition of this invention as an aqueous dispersion of polymer particles. The practice of emulsion polymerization is also discussed in H. Warson, *The Applications of Synthetic Resin Emulsions*, Chapter 2 (Ernest Benn Ltd., London 1972).

Thus the ethylenically unsaturated monomers may be emulsified as known in the art with a stabilizing reagent such as an anionic or nonionic dispersing agent, also referred to as a surfactant. Combinations of anionic and nonionic dispersing agents may also be used. High molecular weight polymers such as hydroxy ethyl cellulose, methyl cellulose, and vinyl alcohol may be used as emulsion stabilizers and protective colloids, as may polyelectrolytes such as polyacrylic acid. Acidic monomers particularly those of low molecular weight, such as acrylic acid and methacrylic acid, are water soluble, and thus may serve as dispersing agents which aid in emulsifying the other monomers used.

Suitable anionic dispersing agents include, for example, the higher fatty alcohol sulfates, such as sodium lauryl sulfate; alkylaryl sulfonates such as sodium or potassium isopropylbenzene sulfonates or isopropyl naphthalene sulfonates; alkali metal higher alkyl sulfosuccinates, such as sodium octyl sulfosuccinate, sodium N-methyl-N-palmitoyl-laurate, sodium oleyl isothionate; alkali metal salts and ammonium salts of alkylarylpolyethoxyethanol sulfates, sulfonates, or phosphates, such as sodium tert-octylphenoxy-polyethoxyethyl sulfate having 1 to 50 oxyethylene units; alkali metal salts and ammonium salts of alkyl polyethoxyethanol sulfates, sulfonates, and phosphates; and alkali metal salts and ammonium salts of aryl polyethoxyethanol sulfates, sulfonates, and phosphates.

Suitable nonionic dispersing agents include alkylphenoxy-polyethoxyethanols having alkyl groups of from about 7 to 18 carbon atoms and from about 6 to about 60 oxyethylene units, such as heptylphenoxypolyethoxyethanols, methyloctyl phenoxypolyethoxyethanols; polyethoxyethanol derivatives of methylene-linked alkyl phenols; sulfur-containing agents such as those made by condensing from about 6 to 60 moles of ethylene oxide with nonyl mercaptan, dodecyl mercaptan, or with alkylthiophenols wherein the alkyl groups contain from 6 to 16 carbon atoms; ethylene oxide derivatives of long chained carboxylic acids, such as lauric acid, myristic acid, palmitic acid, oleic acid, or mixtures of acids such as those found in tall oil containing from 6 to 60 oxyethylene units per molecule; analogous ethylene oxide condensates of long chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; block copolymers of ethylene oxide section combined with one or more hydrophobic propylene oxide sections. Mixtures of alkyl benzenesulfonates and ethoxylated alkylphenols may be employed.

In one embodiment of the invention described above, the polymer comprises, as a polymerized unit, a copolymerizable surfactant having at least one polymerizable ethylenically unsaturated bond. Other monomers that can be copolymerized with the polymer, such as the polyalkylene oxide-derivatized (meth)acrylate type monomers described in U.S. Patent Publication 2001/0031826 (paragraphs 0001-0002), can also be used. Such materials, and those that function similarly, can perform the role of stabilizing reagents.

The polymerization process to prepare the polymer may be a thermal or redox type; that is, free radicals may be generated solely by the thermal dissociation of an initiator species or a redox system may be used. Conventional (thermal) free radical initiators may be used such as, for example, azo compounds, hydrogen peroxide, sodium peroxide, potassium peroxide, t-butyl or t-amyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Alternatively, redox systems using the same initiators (alternatively referred to as "oxidants") coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reactions catalyzing metal salts of iron, copper, manganese, silver, platinum, vanadium, nickel, chromium, palladium, or cobalt may be used. In redox initiated systems, the reducing component is frequently referred to as an accelerator. The initiator and accelerator, commonly referred to as catalyst, catalyst system, or redox system, may be used in proportion from about 0.01% or less to 3% each, based on the weight of monomers to be copolymerized. Examples of redox catalyst systems include t-butyl hydroperoxide/sodium formaldehyde sulfoxylate/Fe(II) and ammonium persulfate/sodium bisulfite/sodium hydrosulfite/Fe(II). The polymerization temperature may be from 10° C. to 90° C., or more, and may be optimized for the catalyst system employed, as is conventional. Emulsion polymerization may be seeded or unseeded.

Chain transfer agents such as mercaptans, polymercaptan, polyhalogen, and allyl compounds in the polymerization mixture may be used to moderate the molecular weight of the polymer. Examples of chain transfer agents which may be used include long chain $C_4$-$C_{22}$ linear or branched alkyl mercaptans such as t-dodecyl mercaptans, alkyl thioglycolates, alkyl mercaptoalkanoates, alcohols such as isopropanol, isobutanol, lauryl alcohol, or t-octyl alcohol, carbon tetrachloride, tetrachloroethylene, tetrabromoethane, and trichlorobromoethane. Generally from 0.1 to 3 weight %, based on the weight of total monomer in the copolymer, may be used. Alternatively, suitable molecular weights may be obtained by increasing the initiator level, or by a combination of increased initiator level and a chain transfer agent.

A monomer emulsion containing all or some portion of the monomers to be polymerized may be prepared using the monomers, water, and surfactants. A catalyst solution containing catalyst in water may be separately prepared. The monomer emulsion and catalyst solution may be cofed into the polymerization vessel over the course of the emulsion polymerization. The reaction vessel itself may initially contain water. The reaction vessel may also additionally contain seed emulsion and further may additionally contain an initial charge of the polymerization catalyst. The temperature of the reaction vessel during the emulsion polymerization may be controlled by cooling to remove heat generated by the polymerization reaction or by heating the reaction vessel. Several monomer emulsions may be simultaneously cofed into the reaction vessel. When multiple monomer emulsions are cofed, they may be of different monomer compositions. The sequence and rates at which the different monomer emulsions are cofed may be altered during the emulsion polymerization process. The pH of the contents of the reaction vessel may also be altered during the course of the emulsion polymerization process.

In one embodiment of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries or morphologies such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. For a multi-staged polymer particle, the amount of phosphorus-containing monomer, or other monomers/components, shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. A preferred multistage emulsion polymer contains phosphorus-containing monomer in only one of the stages.

The polymer particles of the aqueous dispersion may have a particle size of from 20 to 500 nm, preferably 20 to 250 nm, most preferably 50 to 150 nm. The particle size distribution may be unimodal, bimodal, multimodal, or broad. The average particle diameter may be measured by a quasi-elastic light scattering technique, using an instrument such as a Brookhaven Model BI-90 Particle Sizer, supplied by Brookhaven Instruments Corporation, Holtsville, N.Y. Alternatively, for colloids with multi-mode particle size distributions, a particle size analysis method known as capillary hydrodynamic fractionation (CHDF) may be used with an instrument such as the Matec CHDF 2000 (from Matec Applied Sciences, Northborough, Mass.).

The inventive polymers have a weight average molecular weight, $M_w$, in the range 20,000-5,000,000 (preferably 100,000-1,000,000, and more preferably 100,000-500,000) as measured by GPC. If the $M_w$ becomes too low, durability upon exterior exposure is compromised. If the $M_w$ becomes too high, the abrasive scrub performance is compromised.

In a preferred embodiment, the polymerization of the copolymer particles is accomplished using a gradual addition feed process. In this process, a seed polymer is added or formed in situ, and then grown out through the gradual addition of monomer(s). In the case where the seed is formed in situ, a small charge of monomer emulsion to the reactor, typically 3% of the whole monomer emulsion mix, is made and the polymerization is initiated to form a seed. In other cases a fully polymerized particle is added to the reactor of a composition compatible with the monomers to be charged. These are standard emulsion polymerization techniques well known to those skilled in the art.

Figure 1:
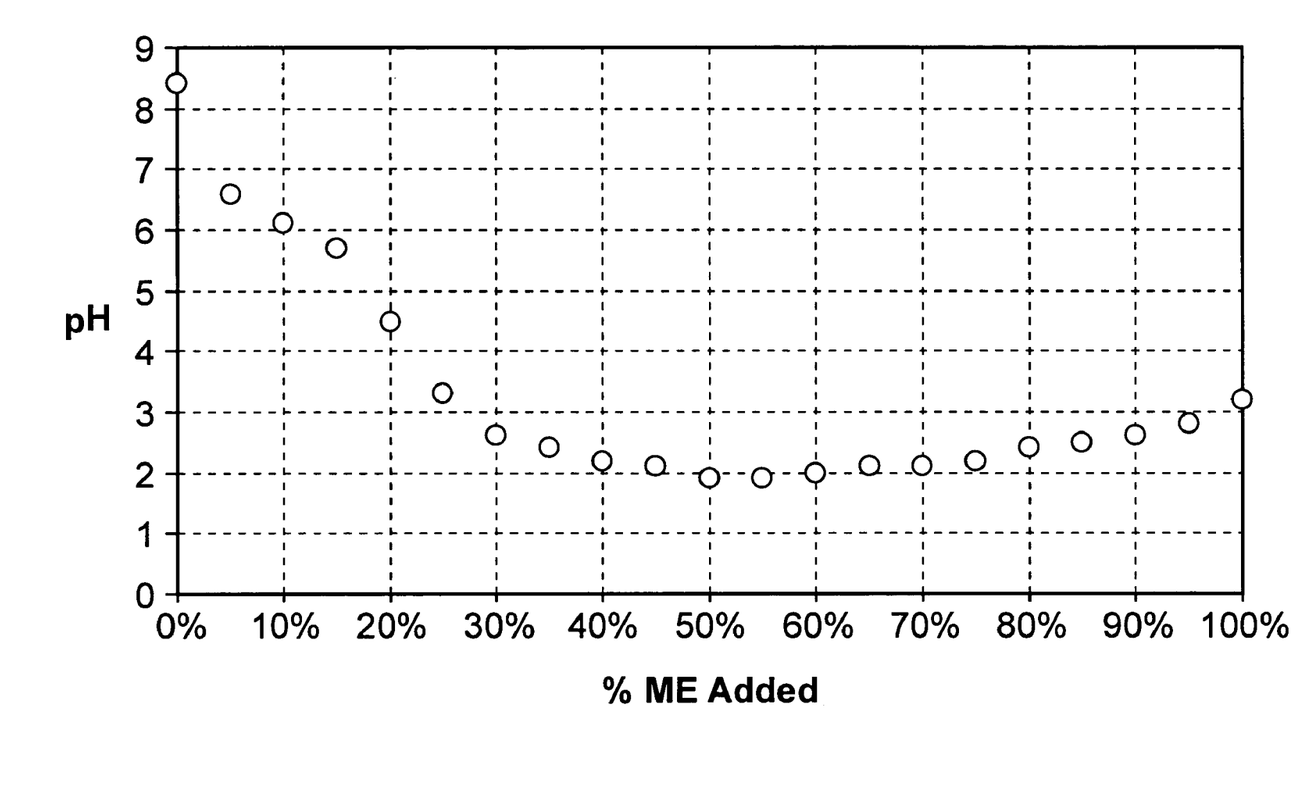

In another preferred embodiment of this invention, the pH is controlled during polymerization of the copolymer to be between 1.5 to 4.5 throughout at least 70% of the phosphorus-containing acidic monomer feed, preferably between 1.5 to 3.5 throughout 70% of the phosphorus-containing acidic monomer feed, and most preferably between 2.0 to 3.0 throughout 100% of the phosphorus-containing acidic monomer feed. As shown in FIG. 1, the pH does not necessarily have to be controlled over the initial 70% range of the monomer addition, but alternatively can be controlled over the final 70% of the addition, or even over some intermediate portion of the monomer addition.

If the pH of the polymerization medium falls below about 1.5 during any substantial period of time during polymerization, the acid-functional monomer tends to polymerize inside the seed particle or polymer particle, which is undesirable. Allowing the copolymer to polymerize substantially on the outside surface of the seed or polymer particle is preferred. If the pH is allowed to rise above about pH 3.5 during any substantial period of time during polymerization, the phosphorus-containing acid monomer can be present in the soluble, de-protonated form, and polymerize in the aqueous medium as opposed to polymerizing substantially on the outside surface of the seed or polymer particle. The pH can be controlled, as taught by the examples that follow, by the addition of basic agents including, but not limited to, ammonium bicarbonate and ammonium hydroxide, or other buffering agents, at various times during polymerization. The exact sequence and amount of addition depends on how much and when phosphorus-containing acid monomers are added (that lower pH, of course). With a minimum effort, one skilled in the art with this general guidance can develop ways to control pH such that it remains within the ranges described above during polymerization. In practice, and as taught in the examples that follow, it has been found that the pH can be adequately controlled as described above by the addition of suitable amounts of ammonium bicarbonate and/or sodium hydroxide at the beginning of the phosphorus-containing monomer emulsion feed, at the midpoint of the feed, and again at the end of the feed. The pH is monitored throughout.

In another preferred embodiment of the present invention, the copolymer was produced by a process in which the acid-functional (carboxylate) monomers and phosphorus-containing monomers are co-fed to the polymerization. In this process, it is important that there is a concentration of the phosphorus-containing monomer and a concentration of the acid-functional (carboxylate) monomer in the reactor available for polymerization simultaneously. If the relative concentration of the acid-functional (carboxylate) monomer becomes too low, then the formation of blocks of polymer comprised of the phosphorus-containing monomer is favored. The generation of simultaneous significant concentrations is best achieved by an overlap in the feed time of the monomers. Because the rate of polymerization is quite rapid, the preferred condition is full overlap of feed times, or the addition of both components to the same monomer emulsion to be fed. However, the scope of the invention also contemplates that the overlap of the feeds can be less than 100%, in which case the benefits of the invention will still be seen, although to a diminishing degree. A suitable process for executing this includes, but is not limited to, forming a monomer emulsion comprising both monomers, and gradually feeding this monomer emulsion to the batch reaction.

Other components may be added to the polymer composition of this invention, including without limitation, other polymers such as vinyl acetate polymers, styrene butadiene polymers, acrylic copolymers, and vinyl chloride copolymers; other pigments or fillers; surfactants; plasticizers; buffers; neutralizers; humectants; waxes; dyes; pearlescents; adhesion promoters; tackifiers; dispersants; defoamers; leveling agents; optical brighteners; ultraviolet stabilizers such as hindered amine light stabilizers; cosolvents; coalescents; rheology modifiers or thickeners; preservatives; biocides; and antioxidants.

The coating composition of this invention may be applied onto substrates using conventional coating application methods, such as, for example, brushing, rolling, dipping, and spraying methods. Substrates to which the coating composition of this invention may be applied include, for example, timber including but not limited to cedar, pine, teak, oak, maple, and walnut; processed timber including but not limited to medium density fiber board, chip board, laminates; mineral substrates including but not limited to masonry, concrete, stucco, fiber, mortar, cement, cement asbestos, plaster, plasterboard, glazed and unglazed ceramic; metal including but not limited to galvanized iron, galvanized steel, cold rolled steel, Zincalum™ metal, Zincalum™ II metal, aluminum, wrought iron, drop forged steel, and stainless steel; previously painted or primed surfaces (fresh, aged or weathered) including but not limited to acrylic coatings, vinyl acrylic coatings, styrene acrylic coatings, powder coated surfaces, solvent acrylic coatings, alkyd resin coatings, solvent urethane coatings, and epoxy coatings; synthetic substrates including but not limited to polyvinyl chloride, polyvinylidene chloride, polyethylene, and polypropylene; asphalt; cellulosic substrates such as paper, paperboard, wallpaper, and wallboard; glass; leather; and woven and nonwoven material such as cloth, wool, synthetic and natural fiber, and textiles. The coating composition may be used, for example, as a wood coating, maintenance coating, interior or exterior wall coating, metal primer or coating, traffic paint, leather coating, coil coating, architectural coating, mastic sealant, caulk, board coating, paper coating, ink, flooring coating, and adhesive. Coatings prepared from the polymer composition may be flat coatings, satin coatings, semi-gloss coatings, gloss coatings, primers, textured coatings, and the like.

After the coating composition has been applied to a substrate, the coating composition is dried or is allowed to dry to form a film. Heat may be applied to dry the coating composition.

TEST PROCEDURES

The following test procedures were used to generate the data reported in the Examples below.

Scrub Resistance Test

This test (based on ASTM D 2486-00) was performed as follows:
A. Preparation of Apparatus:
 1. Abrasion Tester—An abrasion testing device is used which consists of a brush clamped into a bracket which is moved back and forth over the dried, applied paint film by means of a set of cables on either side. The abrasion tester must be leveled before use and operated at 37±1 cycles/minute.
 2. Brush—The bristles, if new, must be leveled before use to permit uniform wear on the paint surface. Leveling is accomplished by running the brush over 100 or 120 mesh aluminum oxide close grain sandpaper.

B. Test:
1. Draw down the paint on a black vinyl chart (Type P-121-10N, The Leneta Company) using the 7 mil opening of a 7/10 Dow film caster, starting from the secured end of the panel. The time for application should be fairly slow, 3 to 4 seconds from end to end, to prevent formation of pinholes in the film. Air dry in a horizontal position for 7 days in an open room kept at 73.5+/−3.5° F. and 50+/−5% relative humidity.
2. Make three drawdowns of each sample. Test two and average them if they are within 25% repeatability. If they are not, test a third and average the three.
3. Secure the drawdown to the abrasion tester by using a gasketed frame and brass weights or clamps.
4. Mount the brush in the holder. Spread 10 grams of a scrub medium (Abrasive Scrub Medium, Type SC-2, The Leneta Company) evenly on the brush bristles. Place the brush at the center of the path. The brush is bristle side up when applying the scrub medium and water, then carefully turn it bristle-side down when starting the test.
5. Start the test. After each 400 cycles before failure, remove the brush (do not rinse); add 10 g of stirred scrub medium; replace the brush. Place 5 ml of water on the brush before continuing.
6. Record the number of cycles to remove the paint film fully in one continuous line. A "PASS" (meaning acceptable scrub resistance) is defined as greater than 1000 cycles.

Stain Resistance Test

Procedure:
1. Cast the test paint on a black vinyl chart with a 7 mil (wet) Dow applicator. Cast a control paint adjacent to the test paint. Dry 1 week at 77+/−3.5° F. and 50+/−5% relative humidity.
2. Mark one half inch sections across the test panel as shown. The total number of sections should correspond to the total number of stains selected plus a ½" gap between stains.
3. Each stain is then applied uniformly to fill in the test area. In order to contain stains to the test area, wet stains, such as grape juice and coffee, can be applied over a ½" strip of cheesecloth which will soak up excess liquid and prevent it from bleeding into the other stained areas.
4. Allow the stains to soak in for at least ½ hour.
5. Wipe off the excess stain with a dry paper towel or dry cheesecloth.
6. For each test sample, prepare a new 6"×9" cheesecloth and attach to a 1 lb abrasion boat. Saturate the cheesecloth with a 1% Tide® laundry detergent solution.
7. Scrub panel for 200 cycles with the 1 lb boat, using a cabled scrub testing device.
8. Rinse panel thoroughly with water, let dry, and then rate the degree of stain removal by eye, on a scale of 1 to 10, corresponding to 10% to 100% removal, by comparing to un-scrubbed sides (i.e. 10 is the best score).

Gloss and Grit Assessment

Procedure:
1. Prepare a drawdown of the test sample on a Leneta 5C chart with a 3 mil Bird film applicator. Let the chart dry at 77+/−3.5° F. and 50+/−5% relative humidity for 7 days.
2. Measure specular gloss at two angles of reflection: 20° and 60°, using a calibrated and standardized Glossgard II Glossmeter, available from the Gardner Company. Higher gloss numbers are preferred for these types of paints, and are compared against the chosen commercial standard (Rhoplex® SG-30).
3. Evaluate the level of grit seen on the dried drawdown. Report the level of grit using the following range: none/very slight/slight/moderate/heavy/severe. Candidates for commercial paints should not have any observable grit, thus the rating "none" is highly preferred.

Viscosity Stability

Procedure:
1. An equilibrated sample of paint is poured into two standard size (½ pint) metal or plastic cans. Each can is filled to approximately 90% of capacity to allow "head room". One sample is placed into the 60° C. oven, and the other sample is retained as a room temperature control. Take initial sheared KU (Stormer) viscosity on the control paint.
2. The time for heat-aging samples is 240 hours in the 60° C. oven. Samples are equilibrated at room temperature for 24 hours, after removing from oven, before checking viscosities or other properties.
3. The heat-aged paint sample is hand stirred with a spatula at a moderate rate for one minute. The viscosity is taken immediately thereafter with a Stormer Viscometer. Paint manufacturers generally prefer a lower value for $\Delta KU$, the change in viscosity, but the acceptable value varies from one manufacturer to another. Herein, viscosity change is evaluated in a comparative sense.

Hiding

Procedure:
1. Using a 1.5 mil Bird applicator, cast thin films of the test paint on Leneta RC-BC black release charts.
2. Using a 25 mil draw down bar, cast one thick film per paint, width-wise, on a Leneta black vinyl scrub chart.
3. Dry overnight at 77+/−3.5° F. and 50+/−5% relative humidity.
4. Place a Kodak® projector glass slide cover (3.25"×4") on the thin film and score with an Excel® knife to obtain the test area. (13 in$^2$)
5. Measure 5 reflectance values using a portable Byk-Gardner 45° reflectometer or similar device, on the scored thin film test area and record the average value. The first measurement is made at the top left hand corner of the test area. The succeeding measurements are made diagonally down to the lower right hand corner. Measure 5 reflectance values on the thick film test area and record the average value.
6. Tare an aluminum weighing pan on an analytical balance.
7. Using the tip of an Exacto® knife, carefully lift the scored thin film test area and put the film into the tared pan on the analytical balance. Be sure to get every bit of film into the pan.
8. Record the weight of the film.
9. From measured reflectance values of thick and thin film and the weight of film test area, calculate hiding "S" values using the formulations listed below.

Kubelka-Munk Equations:
In this test, Kubelka/Munk hiding value "S" is given by:

$$S = X^{-1} R (\ln 1 - R_B R)/(1-R^2)(1-R_B/R)$$

where X is the average film thickness (mils), R is the average reflectance of the thick film and $R_B$ is the average reflectance over black of the thin film on the black Leneta. X can be calculated from the weight of the dry paint film ($W_{pf}$), the density (D) of the dry film; and the film area (A). Film area for a 3.25"×4" template is 13 in².

$$X(\text{mils}) = \frac{Wpf(\text{gms}) \times 1000(\text{mil/inch})}{D(\text{lbs/gal}) \times 1.964(\text{gm/in}^3/\text{lbs/gal}) \times A(\text{in}^2)}$$

Generally, higher S values are always desirable, since more efficient use of pigment can translate to a better quality paint or lower costs (or both) for the paint manufacturer. The data is compared to that obtained for a similarly formulated commercial binder.

EXAMPLE 1

Preparation of a Phosphorus-Functional Polymer with 1.0 Weight Percent PEM

A 5-liter, four necked round bottom flask was equipped with paddle stirrer, thermometer, nitrogen inlet and condenser. In the initial kettle charge, a mixture of 2.11 grams of surfactant A[1] and 814.7 grams of deionized water was added to the kettle and heated to 86° C. under a nitrogen atmosphere. A monomer emulsion ("ME") was prepared by mixing 409 grams of deionized water, 64.53 grams of surfactant A, 1080 grams of butyl acrylate, 880 grams of methyl methacrylate, 5 grams of 1-dodecanethiol, and 40 grams of phosphoethyl methacrylate ("PEM:" 50 weight % active, strong acid monomer). The pH was controlled as shown in FIG. 1, where the monomer emulsion ("ME") percentage addition is plotted against pH which is controlled to be within the range of 1.5 to 3.5 throughout at least 70% of the phosphorus-containing acidic monomer feed. Likewise, in the examples that follow, a similar approach to control the pH was utilized. Thus, with the kettle water at 86° C., the following materials were added in order: a solution of 6.54 grams of ammonium bicarbonate in 41.1 grams of deionized water, 76.5 grams of the ME and 10 grams of deionized water rinse, and a solution of 3.99 grams of ammonium persulfate in 26.4 grams of deionized water. After stirring for 5 minutes, the remaining ME was added over a period of 120 minutes at 86° C. A co-feed solution of 3.99 grams of ammonium persulfate in 144.2 grams of deionized water was gradually added along with the ME feed. When half of the ME was added to the kettle, another co-feed solution of 10.5 grams of ammonium hydroxide (28%) in 72 grams of deionized water was gradually added to the reactor over one hour. After the completion of the monomer addition, the ME container was rinsed with 25 grams of deionized water. A mixture of 14 grams of a 0.15% iron sulfate solution and 8 grams of a 1% ethylenediaminetetraacetic acid tetrasodium salt solution was then added, followed by a solution of 0.29 grams of 70% tert-butyl hydroperoxide in 21 grams of deionized water and a solution of 0.57 grams of isoascorbic acid in 21 grams of deionized water. The reaction mixture was allowed to cool to 72° C. While the reaction mixture was allowed to continue to cool, two chase solutions (0.86 grams of 70% tert-butyl hydroperoxide in 63.4 grams of deionized water and 1.71 grams of isoascorbic acid in 63.4 grams of deionized water) were added over 30 minutes. Ammonium hydroxide (28%, 6.0 grams) was added to the kettle, after which the dispersion was filtered to remove any coagulum. The filtered dispersion had a pH of 8.6, and 52.3% of solids content, and an average particle size of 185 nm. The diameter of the polymer particles was measured by a quasi-elastic light scattering technique, with a Model BI-90 particle sizer of Brookhaven Instruments Corp.

[1] Surfactant A is a 31% solution in water of a mixture of surfactants comprising sodium ethoxylated $C_6$-$C_{18}$ alkyl ether sulfates having 1-40 ethylene oxide monomer residues per molecule.

EXAMPLE 2

Preparation of a Phosphorus-Functional Polymer with Acid-Functional Monomer

The procedure of Example 1 was followed except 20 grams of the methyl methacrylate (in Example 1) was replaced with an equal weight of methacrylic acid (in Example 2). The filtered dispersion had a pH of 8.4, and 51.6% of solids content, and an average particle size of 203 nm by BI-90.

EXAMPLE 3

Comparisons of Paints Made with a Phosphorus-Functional Binder with and without Acid-Functional Monomer Conventional semi-gloss interior wall paints were prepared using the binders from Example 1 and 2 according to the following formulation. The components of the pigment grind were milled on a high speed disk disperser and then the pigment grind was added slowly with slow agitation to the binder. This has been found to be the optimum order of addition, in terms of minimizing grit formation in the paint. The remainder of the letdown components was then added to hit a target viscosity of 90 KU and 1.3 ICI. A control paint was also made using Rhoplex® SG-30 from Rohm and Haas Company, a commercial standard.

| Components | Weight Used (grams) |
|---|---|
| Pigment Grind | |
| Kronos ® 4311 rutile titanium dioxide slurry | 286.3 |
| Tamol ® 1124 dispersant | 0.70 |
| AMP-95 neutralizing Agent | 1.0 |
| Triton ® CF-10 surfactant | 1.0 |
| Drewplus ® L-475 defoamer | 1.0 |
| Minex ® 10 flatting aid | 14.0 |
| Letdown components | |
| Binder | 426.4 |
| Texanol ® coalescent | 4.5 |
| Ethylene glycol anti-freeze | 6.5 |
| Water | 207.6 |
| Ropaque Ultra ® opaque polymer | 35.7 |
| Drewplus ® L-475 defoamer | 1.0 |
| DSX-3075 thickener | 37.8 - for Example 1 |
| | 21.5 - for Example 2 |
| Acrysol ® SCT-275 thickener | 16.8 - for Example 1 |
| | 12.2 - for Example 2 |

These paints were evaluated for viscosity stability, grit level, and scrub resistance as shown in Table 1. The viscosity stability, as measured by overnight ΔKU, is considered to be acceptable for a ΔKU of less than 12, and viscosity stability, as measured by heat age ΔKU, is considered to be acceptable for a ΔKU of less than 20. For the scrub resistance test, acceptable scrub resistance would be greater than 1000 cycles before observing the test end-point (complete removal of the paint film in one continuous line exposing the black vinyl chart).

TABLE 1

| Binder | PEM | MAA | Grit | Overnight ΔKU | Heat Age ΔKU | Scrub (cycles) |
|---|---|---|---|---|---|---|
| Example 1 | 1.0% | 0 | Slight | 6 | 4 | Pass (1225) |
| Example 2 | 1.0% | 1.0% | None | 8 | 15 | Fail (790) |
| Rhoplex® SG-30 | | | None | 8 | 16 | Pass (1350) |

The data in Table 1 show that the incorporation of an acid-functional (carboxylate) monomer via a co-feed process at a controlled pH decreases the formation of grit in the paint. The viscosity stability of the Example paints are in the range of the commercial control.

EXAMPLE 4

Preparation of a Phosphorus-Functional Polymer with 1.5 Weight Percent PEM

A 5-liter, four necked round bottom flask was equipped with paddle stirrer, thermometer, nitrogen inlet and condenser. In the initial kettle charge, a mixture of 8.2 grams of Rhodapex® CO-436 surfactant and 700 grams of deionized water was added to the kettle and heated to 86° C. under a nitrogen atmosphere. A monomer emulsion (ME) was prepared by mixing 500 grams of deionized water, 26.2 grams of Rhodapex® CO-436 surfactant, 950.6 grams of butyl acrylate, 968 grams of methyl methacrylate, 2.5 grams of 1-dodecanethiol, 40 grams of ureido methacrylate (50% solution in water), and 60 grams of phosphoethyl methacrylate (50 weight % active, strong acid monomer). With the kettle water at 86° C., the following materials were added in order: a solution of 3.3 grams of ammonium bicarbonate in 41.3 grams of deionized water, 81.3 grams of the ME and 10 grams of deionized water rinse, and a solution of 3.99 grams of ammonium persulfate in 26.4 grams of deionized water, and a mixture of 19.8 grams of a 0.15% iron sulfate solution and 3 grams of a 1% ethylenediaminetetraacetic acid tetrasodium salt solution. After stirring for 5 minutes, the remaining ME was added over a period of 120 minutes at 86° C. Two cofeed solutions (a solution of 4 grams of 70% tert-amyl hyperoxide and 1.3 grams of Rhodapex® CO-436 surfactant in 144 grams of deionized water, and a solution of 3.1 grams of isoascorbic acid in 135 grams of deionized water) were gradually added along with the monomer emulsion addition. When half of the ME was added to the kettle, 10.5 grams of ammonium hydroxide (28%) was added to the isoascorbic acid cofeed solution. After the completion of the monomer addition, the ME container was rinsed with 20 grams of deionized water. A solution of 0.29 grams of 70% tert-butyl hydroperoxide in 4.3 grams of deionized water, and a solution of 0.20 grams of isoascorbic acid in 6 grams of deionized water were added, and the batch was held at 82° for 15 minutes. A solution of 0.82 grams of 70% tert-butyl hydroperoxide in 21.7 grams of deionized water and a solution of 0.70 grams of isoascorbic acid in 21.7 grams of deionized water were added over 30 minutes while the reaction mixture was allowed to continue to cool to 72°. Ammonium hydroxide (28%, 10.5 grams) was added to the kettle, after which the dispersion was filtered to remove any coagulum. The filtered dispersion had a pH of 8.5, and 52.5% of solids content, and an average particle size of 117 nm by BI-90.

EXAMPLE 5

Preparation of a Phosphorus-Functional Polymer with 1.5 Weight Percent PEM and an Ethoxylate Barrier Layer To 1000 grams of the polymer dispersion prepared in Example 4 was slowly added a solution of 7.9 grams of Triton® X-100 nonionic surfactant in 23.7 grams of deionized water.

EXAMPLE 6

Comparisons of Paints Made with a Phosphorus-Functional Binder With and Without an Ethoxylate Barrier Layer Conventional semi-gloss interior wall paints were prepared using the binders from Examples 4 and 5 according to the procedure described in Example 3, except for each paint made, 28.0 grams of Acrysol® RM-2020 was substituted for the DSX-3075 thickener, and the amount of 2.0 grams of Acrysol® SCT-275 was used as the second thickener. The paint results are shown in Table 2. Again, an acceptable overnight change in KU viscosity would be a ΔKU less than 12.

TABLE 2

| Binder | PEM | MAA | X-100 | Overnight ΔKU | Grit |
|---|---|---|---|---|---|
| Example 4 | 1.5% | 0 | 0 | 3 | Moderate |
| Example 5 | 1.5% | 0 | 1.5% | 9 | None to slight - highly sensitive to mixing conditions used |

The data in Table 2 show that the incorporation of an ethoxylate barrier layer, in this case through the post-addition of a non-ionic surfactant, in a paint made with favorable mixing conditions (pigment added to binder per Example 3), significantly decreases, while not eliminating the formation of grit in the paint.

EXAMPLE 7

Preparation of a Phosphorus-Functional Polymer with Acid-Functional Monomer and an Ethoxylate Barrier Layer The procedure of Example 4 was followed, however, the raw material charges in this Example (Table 3, below) were modified compared with those in Example 4:

TABLE 3

| Component | Example 4 Charge Amount | Example 7 Charge Amount |
|---|---|---|
| Methyl methacrylate | 968 | 978 |
| Methacrylic acid | 0 | 10 grams (0.5 wgt %) |
| Phosphoethyl methacrylate (50 weight % active strong acid monomer) | 60 grams (1.5 wgt %) | 40 grams (1.0 wgt %) |
| Triton ® X-100 post-add | 0 | 30 grams (1.5 wgt. %) |

The filtered dispersion had a pH of 8.5, and 53.4% of solids content, and an average particle size of 115 nm by BI-90.

EXAMPLE 8

Comparisons of Paints Made with a Phosphorus-Functional Binder with and without a Combination of Acid-Functional Monomer and an Ethoxylate Barrier Layer Paints were prepared using the formulation ingredients shown in Example 3, except that the Minex® 10 flatting agent was deleted. The order of addition was reversed relative to that described in Example 3, with the binder here added to the pigment grind, representing a harsh test for a latex adsorption binder. The results are shown in Table 4.

TABLE 4

| Binder | Grit | Hiding (S/mil) | Gloss (20°/60°) |
| --- | --- | --- | --- |
| Example 4 | Severe (solid block) | | |
| Example 7 | Very slight | 8.0 | 34/67 |
| Rhoplex ® SG 30 | None | 7.4 | 31/67 |

The data in Table 4 show that the binder containing the phosphorus monomer, acid-functional (carboxylate) monomer, and ethoxylate layer can be used to make a high hiding (latex adsorbed) paint, even under the unfavorable mixing conditions used in the example. Within the paint industry, the difference in the hiding value (8.0 versus 7.4) displayed by the inventive paint compared to that produced using the commercial Rhoplex® SG-30 represents a significant improvement. The binder containing only the phosphorus functionality (Example 4) did not make a paint under these conditions.

EXAMPLE 9

Comparisons of Paints Made with a Phosphorus-Functional Binder with and without a Combination of Acid-Functional Monomer and an Ethoxylate Barrier Layer Paints were prepared using the formulation ingredients of Example 8, except that the preferred order of addition, namely pigment grind added to binder, was followed. The properties of these paints are shown in Table 5 below.

TABLE 5

| Binder Used | EXAMPLE 4 | EXAMPLE 7 | Rhoplex ® SG-30 |
| --- | --- | --- | --- |
| PEM/MAA Level | 1.5/0 | 1.0/0.5 | Control |
| Grit Level | Slight | None | None |
| Overnight ΔKU (directly off the agitator the next day) | 11 | 12 | 12 |
| Gloss (20°/60°) | 31/64 | 39/70 | 31/67 |
| Hiding (S/mil) | 8.2 | 8.4 | 7.4 |
| Scrub (cycles) | Pass (1218) | Pass (1200) | Pass (1363) |
| Crayon removal | | 8 | 10 |
| Pencil removal | | 7.5 | 5 |
| Lipstick removal | | 9 | 7 |
| Washable black marker removal | | 10 | 10 |
| Black China marker removal | | 1 | 3 |
| Black Pen Removal | | 9 | 6 |
| Blue highlighter removal | | 10 | 10 |
| Mustard removal | | 9 | 4 |
| Coffee removal | | 8 | 1 |
| Overall stain evaluation (vs. SG-30) | | +3 stains | (compared to SG-30) |

The paint utilizing the binder of Example 7 has superior overall stain resistance properties compared to the commercial control, Rhoplex® SG-30 (i.e. the stain resistance is better than Rhoplex® SG-30 for five of the stains, and worse for two of the stains, giving it a net +3 overall stain evaluation compared to Rhoplex® SG-30).

The data in Table 5 show that the paint utilizing a binder embodying the invention (EXAMPLE 7) displays high hiding, and displays the other requisite key properties of an interior wall binder: paint preparation with no visible grit, scrub resistance significantly greater than 1000 cycles, and stain resistance equal or better than the commercial control.

EXAMPLE 10

Preparation of a Phosphorus-Functional Polymer with Acid-Functional Monomer

A 5-liter, four necked round bottom flask was equipped with paddle stirrer, thermometer, nitrogen inlet and condenser. In the initial kettle charge, a mixture of 30.0 grams of surfactant A and 694 grams of deionized water was added to the kettle and heated to 86° C. under a nitrogen atmosphere. A monomer emulsion (ME) was prepared by mixing 511 grams of deionized water, 66.7 grams of surfactant A, 1080 grams of butyl acrylate, 851.6 grams of methyl methacrylate, 2.5 grams of 1-dodecanethiol, 40 grams of ureido methacrylate (50% solution in water), 8.4 grams of acrylic acid, and 40 grams of phosphoethyl methacrylate (50 weight % active, strong acid monomer). With the kettle water at 86° C., the following materials were added in order: a solution of 3.2 grams of ammonium bicarbonate in 41.3 grams of deionized water, a solution of 4 grams of ammonium persulfate in 26.5 grams of deionized water, 88.9 grams of an acrylic emulsion (seed polymer, 45% solids and 100 nm particle size) and 20 grams of deionized water rinse, and a mixture of 19.8 grams of a 0.15% iron sulfate solution and 3 grams of a 1% ethylenediaminetetraacetic acid tetrasodium salt solution. The ME was then added to the kettle at 86° C. over 2 hours. Two cofeed solutions (a solution of 4 grams of 70% tert-amyl hydroperoxide and 1.3 grams of surfactant A in 144 grams of deionized water, and a solution of 3.1 grams of isoascorbic acid in 135 grams of deionized water) were gradually added along with the monomer emulsion addition. When half of the ME was added to the kettle, 10.5 grams of ammonium hydroxide (28%) was added to the isoascorbic acid cofeed solution. After the completion of the monomer addition, the ME container was rinsed with 22 grams of deionized water. A solution of 0.27 grams of 70% tert-butyl hydroperoxide in 5 grams of deionized water, and a solution of 0.20 grams of isoascorbic acid in 6 grams of deionized water were added, and the batch was held at 82° for 15 minutes. A solution of 0.82 grams of 70% tert-butyl hydroperoxide in 25 grams of deionized water and a solution of 0.70 grams of isoascorbic acid in 22 grams of deionized water were added over 30 minutes while the reaction mixture was allowed to cool. Ammonium hydroxide (28%, 16.5 grams) was added to the kettle, after which the dispersion was filtered to remove any coagulum. The filtered dispersion had a pH of 8.1, and 52.6% of solids content.

Examination of the dispersion with CHDF showed that it has two distinctive modes (38% at 211 nm and 62% at 83 nm by weight).

EXAMPLE 11

Preparation of a Phosphorus-Functional Polymer with Acid-Functional Monomer

A 5-liter, four necked round bottom flask was equipped with paddle stirrer, thermometer, nitrogen inlet and condenser. In the initial kettle charge, a mixture of 13.7 grams of Rhodapex® CO-436 surfactant and 690 grams of deionized water was added to the kettle and heated to 86° C. under a nitrogen atmosphere. A monomer emulsion (ME) was prepared by mixing 544 grams of deionized water, 36.3 grams of Rhodapex® CO-436 surfactant, 1080 grams of butyl acrylate, 852 grams of methyl methacrylate, 2.5 grams of 1-dodecanethiol, 40 grams of ureido methacrylate (50% solution in water), 8 grams of itaconic acid, and 40 grams of phosphoethyl methacrylate (50 weight % active, strong acid monomer). With the kettle water at 86° C., the following materials were added in order: a solution of 3.3 grams of ammonium bicarbonate in 41.3 grams of deionized water, a solution of 4 grams of ammonium persulfate in 26.5 grams of deionized water, 88.9 grams of an acrylic emulsion (seed polymer, 45% solids and 100 nm particle size) and 20 grams of deionized water rinse, and a mixture of 19.8 grams of a 0.15% iron sulfate solution and 3 grams of a 1% ethylenediaminetetraacetic acid tetrasodium salt solution. The ME was then added to the kettle at 86° C. over 2 hours. Two cofeed solutions (a solution of 4 grams of 70% tert-amyl hydroperoxide and 0.7 grams of Rhodapex® CO-436 in 144 grams of deionized water, and a solution of 3.1 grams of isoascorbic acid in 135 grams of deionized water) were gradually added along with the monomer emulsion addition. When half of the ME was added to the kettle, 10.5 grams of ammonium hydroxide (28%) was added to the isoascorbic acid cofeed solution. After the completion of the monomer addition, the ME container was rinsed with 22 grams of deionized water. A solution of 0.27 grams of 70% tert-butyl hydroperoxide in 5 grams of deionized water, and a solution of 0.20 grams of isoascorbic acid in 6 grams of deionized water were added, and the batch was held at 82° for 15 minutes. A solution of 0.82 grams of 70% tert-butyl hydroperoxide in 25 grams of deionized water and a solution of 0.70 grams of isoascorbic acid in 22 grams of deionized water were added over 30 minutes while the reaction mixture was allowed to cool. Ammonium hydroxide (28%, 16.5 grams) was added to the kettle, after which the dispersion was filtered to remove any coagulum. The filtered dispersion had a pH of 9.0, and 52.3% of solids content. Examination of the dispersion with CHDF showed that it has two distinctive modes (40% at 216 nm and 60% at 88 nm by weight).

EXAMPLE 12

Preparation of a Phosphorus-Functional Polymer with Acid-Functional Monomer

The procedure of Example 10 was followed, except that the monomer emulsion was prepared by mixing 544 grams of deionized water, 36.3 grams of Rhodapex® CO-436 surfactant, 700 grams of butyl acrylate, 400 grams of 2-ethylhexyl acrylate, 830 grams of methyl methacrylate, 2.5 grams of 1-dodecanethiol, 40 grams of ureido methacrylate (50% solution in water), 10 grams of methacrylic acid, and 40 grams of phosphoethyl methacrylate (50 weight % active, strong acid monomer). The filtered dispersion had a pH of 8.9, and 53.0% of solids content. Examination of the dispersion with CHDF showed that it has two distinctive modes (35% at 207 nm and 65% at 91 nm by weight).

EXAMPLE 13

Preparation of a Phosphorus-Functional Polymer with Acid-Functional Monomer

A 5-liter, four necked round bottom flask is equipped with paddle stirrer, thermometer, nitrogen inlet and condenser. In the initial kettle charge, a mixture of 13.7 grams of Rhodapex® CO-436 surfactant and 690 grams of deionized water is added to the kettle and heated to 86° C. under a nitrogen atmosphere. A monomer emulsion (ME) is prepared by mixing 544 grams of deionized water, 36.3 grams of Rhodapex® CO-436 surfactant, 1000 grams of butyl acrylate, 940 grams of methyl methacrylate, 2.5 grams of 1-dodecanethiol, 40 grams of ureido methacrylate (50% solution in water), 10 grams of methacrylic acid, and 30 grams of Sipomer® PAM-200[2]. With the kettle water at 86° C., the following materials are added in order: a solution of 1.6 grams of ammonium bicarbonate in 41.3 grams of deionized water, a solution of 4 grams of ammonium persulfate in 26.5 grams of deionized water, 88.9 grams of an acrylic emulsion (seed polymer, 45% solids and 100 nm particle size) and 20 grams of deionized water rinse, and a mixture of 19.8 grams of a 0.15% iron sulfate solution and 3 grams of a 1% ethylenediaminetetraacetic acid tetrasodium salt solution. The ME is then added to the kettle at 86° C. over 2 hours. Two cofeed solutions (a solution of 4 grams of 70% tert-amyl hydroperoxide and 0.7 grams of Rhodapex® CO-436 in 144 grams of deionized water, and a solution of 3.1 grams of isoascorbic acid in 135 grams of deionized water) are gradually added along with the monomer emulsion addition. When half of the ME is added to the kettle, 7 grams of ammonium hydroxide (28%) is added to the isoascorbic acid cofeed solution. After the completion of the monomer addition, the ME container is rinsed with 20 grams of deionized water. A solution of 0.27 grams of 70% tert-butyl hydroperoxide in 5 grams of deionized water, and a solution of 0.20 grams of isoascorbic acid in 6 grams of deionized water are added, and the batch is held at 82° for 1.5 minutes. A solution of 0.82 grams of 70% tert-butyl hydroperoxide in 25 grams of deionized water and a solution of 0.70 grams of isoascorbic acid in 22 grams of deionized water are added over 30 minutes while the reaction mixture is allowed to cool. Ammonium hydroxide (28%, 13 grams) is added to the kettle, after which the dispersion is filtered to remove any coagulum. A solution of 20 grams of Triton X-100 in 75 grams of deionized water is added to give the polymer emulsion.

[2]Sipomer® is a trademark of Rhodia. Sipomer® PAM-200 is a phosphate containing monomer made by Rhodia.

EXAMPLE 14

Preparation of a Phosphorus-Functional Polymer with Acid-Functional Monomer and Methoxypolyethyleneglycol 550 Methacrylate The procedure of Example 10 was followed, except that the monomer emulsion was prepared by mixing 544 grams of deionized water, 36.3 grams of Rhodapex® CO-436 surfactant, 1080 grams of butyl acrylate, 810.5 grams of methyl methacrylate, 2.5 grams of 1-dodecanethiol, 40 grams of ureido methacrylate (50% solution in water), 10 grams of methacrylic acid, 40 grams of phosphoethyl methacrylate (50 weight % active, strong acid monomer), and 39.5 grams of Bisomer MPEG550MA (methoxypolyethyleneglycol 550 methacrylate).

The filtered dispersion had a pH of 8.3, and 52.7% of solids content. Examination of the dispersion with CHDF showed that it has two distinctive modes (34% at 225 nm and 66% at 99 nm by weight).

EXAMPLE 15

Multistage Polymerization to Prepare a Phosphorus-Functional Polymer with Acid-Functional Monomer A 5-liter, four necked round bottom flask was equipped with paddle stirrer, thermometer, nitrogen inlet and condenser. In the initial kettle charge, a mixture of 15.5 grams of Rhodapex® CO-436 surfactant and 700 grams of deionized water was added to the kettle and heated to 86° C. under a nitrogen atmosphere. A monomer emulsion (ME) was prepared by mixing 496 grams of deionized water, 34.5 grams of Rhodapex® CO-436 surfactant, 1008.5 grams of butyl acrylate, 883.3 grams of methyl methacrylate, 2.4 grams of 1-dodecanethiol, 9.7 grams of methacrylic acid, and 38.8 grams of phosphoethyl methacrylate (50 weight % active, strong acid monomer). With the kettle water at 86° C., the following materials were added in order: a solution of 4.6 grams of ammonium bicarbonate in 41.3 grams of deionized water, a solution of 4 grams of ammonium persulfate in 26.5 grams of deionized water, 88.9 grams of an acrylic emulsion (seed polymer, 45% solids and 100 nm particle size) and 20 grams of deionized water rinse, and a mixture of 19.8 grams of a 0.15% iron sulfate solution and 3 grams of a 1% ethylenediaminetetraacetic acid tetrasodium salt solution. The ME was then added to the kettle at 86° C. over 2 hours. Two cofeed solutions (a solution of 4 grams of 70% tert-amyl hydroperoxide and 0.7 grams of Rhodapex® CO-436 in 144 grams of deionized water, and a solution of 3.1 grams of isoascorbic acid in 135 grams of deionized water) were gradually added along with the monomer emulsion addition. When half of the ME was added to the kettle, 10.5 grams of ammonium hydroxide (28%) was added to the isoascorbic acid cofeed solution. After the completion of the monomer addition, the ME container was rinsed with 45 grams of deionized water. The reaction mixture was held at 86° C. for 5 minutes and then cooled to 60° C. With the temperature at 60° C., a mixture of 39 grams of styrene and 26.3 grams of divinylbenzene was added, followed by a solution of 2.3 grams of 70% tert-butyl hydroperoxide in 15 grams of deionized water and a solution of 1 grams of isoascorbic acid in 20 grams of deionized water. After 15 minutes at 60° C., the reaction mixture was allowed to cool down. A solution of 0.82 grams of 70% tert-butyl hydroperoxide in 25 grams of deionized water and a solution of 0.70 grams of isoascorbic acid in 25 grams of deionized water were added over 30 minutes while the reaction mixture was allowed to cool. Ammonium hydroxide (28%, 17 grams) was added to the kettle, after which the dispersion was filtered to remove any coagulum. The filtered dispersion had a pH of 8.3, and 51.0% of solids content. Examination of the dispersion with CHDF showed that it has two distinctive modes (40% at 218 nm and 60% at 84 nm by weight).

EXAMPLE 16

Preparation of a Phosphorus-Functional Multistage Polymer with Acid-Functional Monomer and an Ethoxylate Barrier Layer To 1000 grams of the polymer dispersion prepared in Example 15 was slowly added a solution of 7.7 grams of Triton X-100 nonionic surfactant in 23.1 grams of deionized water.

EXAMPLE 17

Multistage Polymerization to Prepare a Phosphorus-Functional Polymer with Acid-Functional Monomer A 5-liter, four necked round bottom flask was equipped with paddle stirrer, thermometer, nitrogen inlet and condenser. In the initial kettle charge, a mixture of 7.6 grams of Rhodapex® CO-436 surfactant and 694 grams of deionized water was added to the kettle and heated to 86° C. under a nitrogen atmosphere. A monomer emulsion (ME) was prepared by mixing 480 grams of deionized water, 36 grams of Rhodapex® CO-436 surfactant, 1044.1 grams of butyl acrylate, 693 grams of methyl methacrylate, 2.3 grams of 1-dodecanethiol, 9 grams of methacrylic acid, and 36 grams of phosphoethyl methacrylate (50 weight % active, strong acid monomer). With the kettle water at 86° C., the following materials were added in order: a solution of 6.6 grams of ammonium bicarbonate in 41.3 grams of deionized water, a solution of 4 grams of ammonium persulfate in 26.5 grams of deionized water, 151 grams of an acrylic emulsion (seed polymer, 45% solids and 100 nm particle size) and 20 grams of deionized water rinse, and a mixture of 19.8 grams of a 0.15% iron sulfate solution and 3 grams of a 1% ethylenediaminetetraacetic acid tetrasodium salt solution. The ME was then added to the kettle at 86° C. over 100 minutes. Two co-fed solutions (a solution of 4 grams of 70% tert-amyl hydroperoxide and 0.7 grams of Rhodapex® CO-436 in 144 grams of deionized water, and a solution of 3.1 grams of isoascorbic acid in 135 grams of deionized water) were gradually added over a period of 2 hours along with the monomer emulsion addition. When half of the ME was added to the kettle, 10.5 grams of ammonium hydroxide (28%) was added to the isoascorbic acid cofeed solution. The reaction mixture was held at 86° C. for 5 minutes. A second monomer emulsion made from 4.1 grams of Rhodapex® CO-436, 51 grams of deionized water, 158 grams of methyl methacrylate, 40 grams of butyl acrylate, and 2 grams of allyl methacrylate was added over 15 minutes along with the remaining cofeed solutions. After the completion of the monomer addition, the ME container was rinsed with 45 grams of deionized water. The reaction mixture was held at 86° C. for 15 minutes. A solution of 0.27 grams of 70% tert-butyl hydroperoxide in 5 grams of deionized water, and a solution of 0.20 grams of isoascorbic acid in 6 grams of deionized water were added, and the batch was cooled to 60° C. A solution of 0.82 grams of 70% tert-butyl hydroperoxide in 25 grams of deionized water and a solution of 0.70 grams of isoascorbic acid in 22 grams of deionized water were added over 30 minutes while the reaction mixture continued to cool. Ammonium hydroxide (28%, 16.5 grams) was added to the kettle, after which the dispersion was filtered to remove any coagulum. The filtered dispersion had a pH of 9.1, and 52.5% of solids content.

Examination of the dispersion with CHDF showed that it has two distinctive modes (49% at 224 nm and 51% at 87 nm by weight).

EXAMPLE 18

Preparation of a Phosphorus-Functional Multistage Polymer with Acid-Functional Monomer and an Ethoxylate Barrier Layer To 1000 grams of the polymer dispersion prepared in Example 17 was slowly added a solution of 7.9 grams of Triton X-100 nonionic surfactant in 23.7 grams of deionized water.

We claim:

1. A coating composition comprising:
   (A) an aqueous dispersion of particles made from a copolymer comprising, based on the weight of the copolymer:
      (i) 97.5-99.3 parts by weight of polymerized units of one or more monoethylenically unsaturated monomers;
      (ii) 0.1-1.0 parts by weight of polymerized units of a carboxylic acid functional or anionic monomer; and
      (iii) 0.6-1.5 parts by weight of polymerized units of a phosphorus-containing monomer; and
   where the dispersion further comprises 0.5-5.0 parts by weight, in relation to parts of copolymer, of an nonionic surfactant containing —(CH$_2$—CHRO)$_z$—X groups, where R=H or CH$_3$, z=3-60, and X is a nonionic functionality, wherein said —(CH$_2$—CHRO)$_z$—X groups are adsorbed onto the surface of the particles; and
   (B) titanium dioxide.

2. The composition of claim 1 wherein the copolymer comprises 0.75-1.0 parts by weight of polymerized units of a phosphorus-containing monomer.

3. The composition of claim 1 wherein the copolymer comprises 0.2-0.5 parts by weight of polymerized units of a carboxylic acid functional or anionic monomers).

4. The composition of claim 1 wherein the nonionic surfactant is an ethoxylated nonylphenol, a propoxylated nonylphenol, an ethoxylated alcohol, or a propoxylated alcohol; and wherein the copolymer is an acrylic, a styrene/acrylic, or a vinyl acetate/acrylic copolymer.

5. A composition comprising:
   (A) an aqueous dispersion of particles made from a copolymer comprising, based on the weight of the copolymer:
      (i) 97.5-99.3 parts by weight of polymerized units one or more monoethylenically unsaturated monomers;
      (ii) 0.2-0.5 parts by weight of polymerized units of a carboxylic acid functional or anionic monomer; and
      (iii) 0.75-1.0 parts by weight of polymerized units of a phosphorus-containing monomer; and
   where the dispersion further comprises 0.5-3.0 parts by weight, in relation to parts of copolymer, of a nonionic surfactant containing —(CH$_2$—CHRO)$_z$X groups, where R=H or CH$_3$, z=3-60, and X is a nonionic functionality; and
   (B) titanium dioxide; wherein:
      a) the —(CH$_2$—CHRO)$_z$—X groups are adsorbed onto the surface of the particles;
      b) the nonionic surfactant is an ethoxylated nonylphenol, a propoxylated nonylphenol, an ethoxylated alcohol, or a propoxylated alcohol; and
      c) the copolymer is an acrylic, a styrene/acrylic, or a vinyl acetate/acrylic copolymer.

6. A method of making the coating composition of claim 1 of combining an aqueous dispersion of a thermoplastic copolymer with 0.5 to 5 weight percent of the nonionic surfactant, based on the weight of the copolymer, wherein the copolymer comprises:
   (i) 97.5-99.3 parts by weight of polymerized units one or more monoethylenically unsaturated monomers;
   (ii) 0.1-1.0 parts by weight of polymerized units of a carboxylic acid functional or anionic monomer; and
   (iii) 0.6-1.5 parts by weight of polymerized units of a phosphorus-containing monomer;
wherein the nonionic surfactant contains —(CH$_2$—CHRO)$_z$—X groups, where R=H or CH$_3$; z=3-60; and X is a nonionic functionality.

7. The method of claim 6 wherein in the copolymer contains from 0.2 to 0.5 parts by weight of polymerized units of a carboxylic acid functional or anionic monomer; and 0.75-1.0 parts by weight of polymerized units of a phosphorus-containing monomer;
wherein the nonionic surfactant is an ethoxylated nonylphenol, a propoxylated nonylphenol, an ethoxylated alcohol, or a propoxylated alcohol; and wherein the copolymer is an acrylic, a styrene/acrylic, or a vinyl acetate/acrylic copolymer.

* * * * *